United States Patent
Wang et al.

(10) Patent No.: US 6,745,056 B2
(45) Date of Patent: Jun. 1, 2004

(54) METHOD AND SYSTEM FOR IMPROVING BATTERY PERFORMANCE IN BROADCAST PAGING

(75) Inventors: Jun Wang, San Diego, CA (US); Ragulan Sinnarajah, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 184 days.

(21) Appl. No.: 09/905,507

(22) Filed: Jul. 13, 2001

(65) Prior Publication Data

US 2003/0032462 A1 Feb. 13, 2003

(51) Int. Cl.[7] .............................................. H04B 1/38
(52) U.S. Cl. ..................... 455/574; 455/343.1; 455/458; 455/515
(58) Field of Search ................................ 455/574, 458, 455/515, 522, 343.1, 434; 370/335

(56) References Cited

U.S. PATENT DOCUMENTS

| | | | |
|---|---|---|---|
| 5,485,463 A | | 1/1996 | Godoroja |
| 6,069,880 A | * | 5/2000 | Owen ........................... 370/311 |
| 6,101,394 A | * | 8/2000 | Illidge ........................ 455/466 |
| 6,111,865 A | | 8/2000 | Butler et al. |
| 6,157,815 A | * | 12/2000 | Collins ....................... 455/38.1 |
| 6,339,588 B1 | * | 1/2002 | Katsuragawa ............... 370/311 |
| 6,356,538 B1 | * | 3/2002 | Li .............................. 370/311 |
| 6,560,439 B1 | * | 5/2003 | Grayson ...................... 455/12.1 |
| 6,577,608 B1 | * | 6/2003 | Moon .......................... 370/311 |

FOREIGN PATENT DOCUMENTS

| | | | |
|---|---|---|---|
| JP | P2000-32556 A | 1/2000 | |
| WO | WO 0035209 | 6/2000 | ............ H04Q/7/20 |
| WO | WO 00/35209 | * 6/2000 | ............ H04Q/7/20 |

OTHER PUBLICATIONS

XP–001003361, Munje, Arun et al., "An Improved Hashing Function for IS–2000 Quick Paging Channel," IEEE Communications Letters, vol. 5, No. 1 (Jan. 2001).
XP–002215378, Sarkar, Sandip et al., "cdma2000: Battery Life Improvement Techniques," Qualcomm, Inc. (Sep. 18, 2000).
XP–001006300, Sarkar, Sandip et al., "Phone Standby Time and the Quick Paging Channel," PIMRC (Sep. 12, 1999).

* cited by examiner

Primary Examiner—William Trost
Assistant Examiner—Brandon J Miller
(74) Attorney, Agent, or Firm—Philip R. Wadsworth; Kent D. Baker; S. Hossain Beladi

(57) ABSTRACT

A method and system are provided that allow a mobile communications service provider to broadcast messages using more than one broadcast channel protocol, such that only the mobile stations designed to receive broadcast messages transmitted under each protocol are woken up to monitor their respective broadcast channel slots, thus saving battery life in mobile stations designed to receive broadcast messages transmitted using other broadcast channel protocols.

12 Claims, 5 Drawing Sheets

METHOD AND SYSTEM FOR IMPROVING BATTERY PERFORMANCE IN BROADCAST PAGING

BACKGROUND

1. Field

The present invention relates generally to telecommunications systems, and more specifically to a method and system for improving battery life in mobile stations designed to receive broadcast messages.

2. Background

In cellular telephone systems such as the IS-95 family of code division multiple access (CDMA) systems defined in the IS-95, IS-95A, and IS-95B standards and earlier versions of cdma2000, a base station uses a paging channel (F-PCH) to transmit broadcast pages and broadcast messages to target mobile stations. The base station may also send broadcast indicators on quick paging channel (F-QPCH) slots to inform the target mobile stations to monitor the F-PCH channel slots for the upcoming broadcast pages and/or broadcast messages.

In the newer versions of cdma2000, the base station uses a common control channel (F-CCCH) to transmit broadcast pages, a broadcast control channel (F-BCCH) to transmit broadcast messages. The base station may also send broadcast indicators on the F-QPCH channel slots to inform the target mobile stations to monitor the F-CCCH slots for the broadcast pages, which may point to the assigned F-BCCH channel slots that carry broadcast messages.

A service provider may choose to adopt either of the above broadcasting channel protocols to broadcast messages to target mobile stations, but only the mobile stations that are designed for a chosen broadcasting channel protocol would be able to receive the broadcast messages. It is highly desirable to transmit broadcast messages using both broadcasting channel protocols such that the mobile stations that are designed to receive broadcast messages transmitted in either broadcasting channel protocol would be able to receive the broadcast messages.

Currently, if a service provider transmits a broadcast message using both broadcasting channel protocols, the broadcast indicators on the F-QPCH channel slots, which may be used to signal a group of mobile stations to monitor the broadcast pages on either the F-PCH or F-CCCH channel, may cause false signaling to other mobile stations. For example, a broadcast indicator on a F-QPCH channel slot that correctly points to a broadcast page slot on the F-PCH channel may also erroneously point to a broadcast page slot on the F-CCCH channel. Consequently, the mobile stations that are designed to monitor the F-CCCH channel slots may be unnecessarily awakened to monitor the F-CCCH channel slots. Therefore, these mobile stations may suffer from unnecessary battery consumption.

There is a need in the art for providing broadcast messages using more than one broadcasting channel protocol such that the mobile stations designed to receive broadcast messages using one broadcasting channel protocol produce no false signaling to the mobile stations designed to receive broadcast messages using other broadcast channel protocols.

SUMMARY

One aspect of the present invention is directed to a method and system for providing broadcast messages using more than one broadcast channel protocol. The method and system may include transmitting a plurality of first broadcast page slots on a first channel, transmitting a plurality of second broadcast page slots on a second channel, and transmitting a plurality of broadcast indicators on a third channel, such that each one of the plurality of broadcast indicators may point to only one of the first or second broadcast page slots.

In one embodiment of the present invention, the first broadcast page slots on the first channel may be shifted with respect to the second broadcast page slots on the second channel.

In another embodiment of the present invention, the first broadcast page slots on the first channel and the second broadcast page slots on the second channel may be transmitted at different broadcast page cycles.

Another embodiment of the present invention is directed to a base station for providing broadcast messages, which may include a transmitter and a processor. The transmitter may be adapted to transmit a plurality of first broadcast page slots on a first channel, transmit a plurality of second broadcast page slots on a second channel, and transmit a plurality of broadcast indicators on a third channel. The processor may be adapted to control the transmitter such that each one of the plurality of broadcast indicators points to only one of the first or second broadcast page slots.

In one embodiment of the present invention, the processor may be further adapted to shift the plurality of first broadcast page slots on the first channel with respect to the plurality of second broadcast page slots on the second channel.

In one embodiment of the present invention, the processor may be further adapted to control the transmitter to transmit the plurality of first broadcast page slots on the first channel and the plurality of second broadcast page slots on the second channel at different broadcast page cycles.

DETAILED DESCRIPTION

Figure 1:
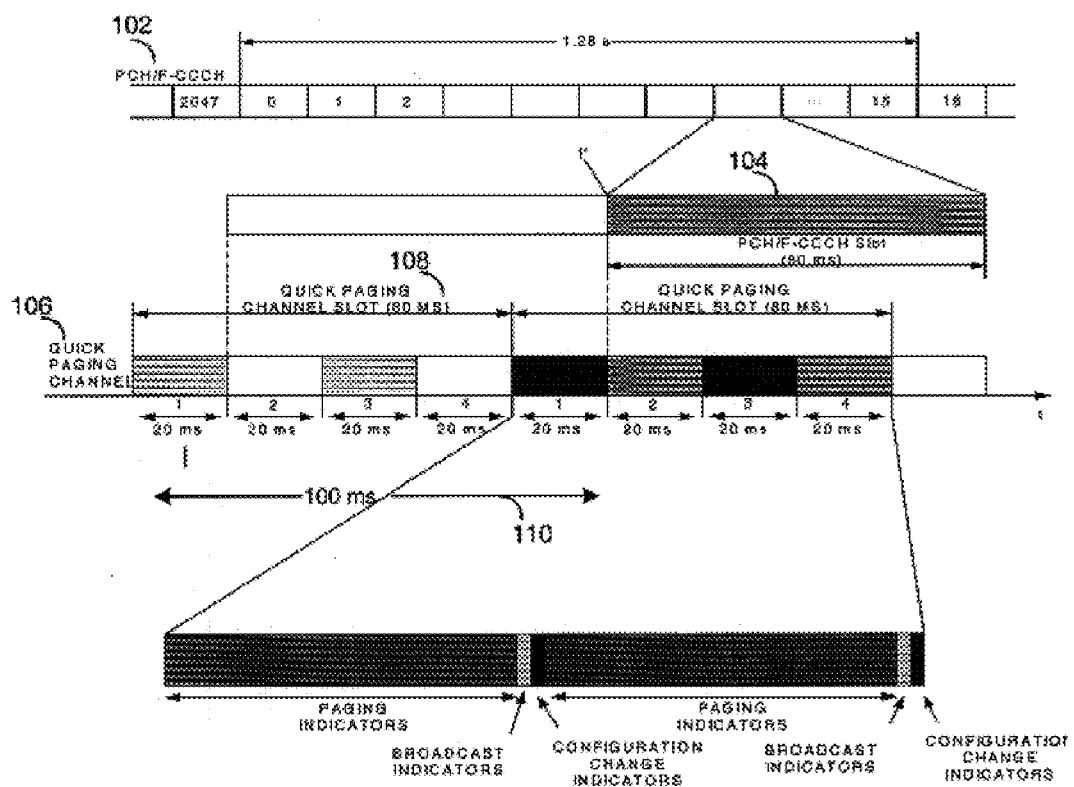
FIG. 1 is a representation of an exemplary arrangement for forward channels used in message broadcasting.

The paging channel may be divided into 80 ms slots called paging channel slots. Paging and control messages for a mobile station operating in the non-slotted mode may be received in any one of the paging channel slots. Therefore, the non-slotted mode of operation requires the mobile station to monitor all slots. The forward common control channel also may be divided into 80 ms slots called forward common control channel slots. Paging and mobile-directed messages for a mobile station operating in the non-slotted mode may be received in any one of the forward common control channel slots. Therefore, the non-slotted mode of operation requires the mobile station to continuously monitor the forward common control channel.

The paging channel protocol or the forward common control channel protocol may provide for scheduling the transmission of messages for a specific mobile station in certain assigned slots. A mobile station that monitors the paging channel or the forward common control channel only during the assigned slots is referred to as operating in the slotted mode. During the slots in which the paging channel or the forward common control channel is not being monitored, the mobile station may stop or reduce its processing for power conservation.

A mobile station operating in the slotted mode generally monitors the paging channel or the forward common control channel for one or two slots per slot cycle. The mobile station may specify its preferred slot cycle, e.g., by using the SLOT_CYCLE_INDEX field provided in the registration message, origination message, or page response message. The mobile station may also specify its preferred slot cycle using the SLOT_CYCLE_INDEX field of the terminal information record of the status response message or the extended status response message. Those of skill in the art would recognize that the messages referred to herein are defined in the cdma2000 standards.

The base station may transmit broadcast messages, e.g., data burst messages with broadcast addresses, to target mobile stations. In order to notify the mobile stations operating in slotted mode that a broadcast message is being transmitted to them, the base station may send a broadcast page, such as the general page message (GPM) or the universal page message (UPM) with a broadcast address type, to the target mobile stations. The physical channel or channels on which the broadcast pages and the corresponding broadcast messages may be transmitted to the mobile stations may depend on the common channel configuration. Two exemplary channel configurations are considered here.

The first configuration corresponds to the broadcasting channel protocol used in the IS-95 family of CDMA systems as well as the prior releases of cdma2000. In this configuration, the forward channels may include the paging channel (F-PCH), and the quick paging channel (F-QPCH). Both a broadcast page, which may point to a companion broadcast message slot that contains a broadcast message, and the broadcast message may be sent on the F-PCH.

The second configuration corresponds to the broadcasting channel protocol used in the newer release of cdma2000, e.g., Release A. In this configuration, the forward channels may include the common control channel (F-CCCH), broadcast control channel (F-BCCH), and the quick paging channel (F-QPCH). The broadcast page may be sent on the F-CCCH, and the broadcast message may be sent on the F-BCCH.

The broadcast pages may be distributed either on the F-PCH or the F-CCCH at specially defined channel slot cycles. On the F-PCH, a broadcast paging cycle (BPC) may have a duration of $(B_1+X_1)$ F-PCH slots, in which:

$$B_1=2^i \times 16, \ 1 \leq i \leq 7$$

where i=BCAST_INDEX may be transmitted by the base station in the extended system parameters message or set by default when the extended system parameters message is not sent.

In order to reduce overhead, not to interfere with regular pages, and be efficient, the broadcast pages may be sent in the first slot of a broadcast paging cycle. The first slot of each broadcast paging cycle on the F-PCH is a paging channel slot in which:

$$\lfloor t/4 \rfloor \mod(B_1+X_1)=0,$$

where t represents system time in frames.

Distribution of broadcast pages may also be on specially defined F-CCCH slot cycles. On the F-CCCH, the BPC may have a duration of $(B_2+X_2)$ F-CCCH channel slots, in which:

$$B_2=2^{1+i} \times 16, \ 1 \leq i \leq 7$$

where i=BCAST_INDEX may be transmitted by the base station in the system parameters message. The first slot of each broadcast paging cycle on the F-CCCH is a F-CCCH slot in which:

$$\lfloor t/4 \rfloor \mod(B_2+X_2)=0,$$

where t represents system time in frames.

The F-QPCH may be divided into slots, e.g., 80 ms, called F-QPCH slots. The F-QPCH protocol may provide for scheduling the transmission of the paging indicators, the configuration change indicators, and the broadcast indicators in an F-QPCH slot. In order to reduce battery drainage in mobile stations due to unnecessary monitoring of every broadcast paging cycle slot, the F-QPCH slots may contain broadcast indicator (BI) bits that may be used to inform target mobile stations when to monitor the F-PCH/F-CCCH slot for a broadcast page. That is, if there is a broadcast page on the F-CCCH, for example, the BI bits of the corresponding F-QPCH slot are turned on to signal the target mobile stations to monitor the F-CCCH slots.

In one embodiment, a service provider may support broadcast messaging using both F-PCH and F-CCCH/F-BCCH broadcasting channel protocols. Therefore, if both channel protocols operate in slotted mode with the quick paging channel, the same F-QPCH may be used to signal a mobile unit that is configured to monitor either the F-PCH or the F-CCCH/F-BCCH for a broadcast page. In this embodiment, the BIs corresponding to the F-PCH may signal a group of mobile units to monitor the paging channel slots on the F-PCH, and the BIs corresponding to the F-CCCH may signal another group of mobile units to monitor the forward common control channel slots on the F-CCCH.

FIG. 1 shows a representation of an exemplary arrangement for forward channels used in message broadcasting. The F-PCH/F-CCCH 102 may be divided into 80 ms slots 104 called paging channel slots. The quick paging channel 106 may be also divided into 80 ms slots 108 called F-QPCH slots. According to one embodiment, if a mobile station operates in the slotted mode, is configured to receive the broadcast messages, and supports the quick paging channel scheme, the mobile station may monitor broadcast indicators on an assigned F-QPCH channel slot that is offset from the mobile station's assigned broadcast page slots by a predetermined time interval 110, e.g., 100 ms, as shown in FIG. 1.

Figure 2:
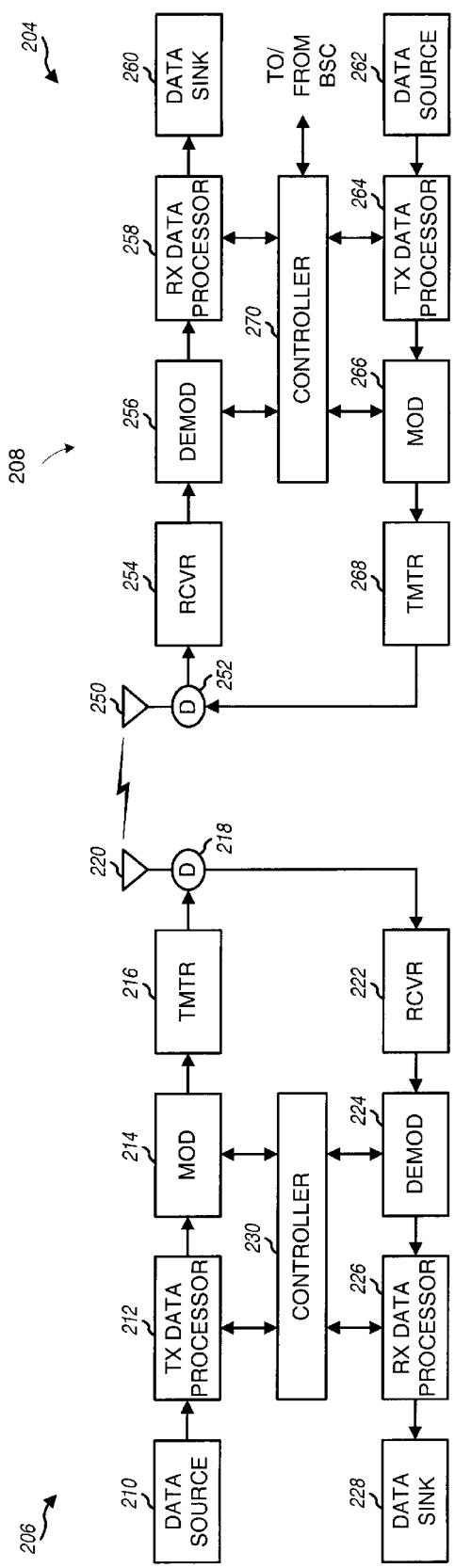
FIG. 2 is a representation of an exemplary base station and mobile station that may be used in message broadcasting.

FIG. 2 is a simplified block diagram of an embodiment of base station 204 and remote terminal 206, which are capable of implementing various aspects of the invention. For a particular communication, voice data, packet data, and/or messages may be exchanged between base station 204 and remote terminal 206, via an air interface 208. Various types of messages may be transmitted, such as messages used to establish a communication session between the base station and remote terminal and messages used to control a data transmission (e.g., power control, data rate information, acknowledgment, and so on).

For the reverse link, at remote terminal 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer (D) 252, and provided to a receiver unit (RCVR) 254. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator (DEMOD) 256 may implement a rake receiver that processes multiple instances of the received signal and generates combined symbols. A receiving (RX) data processor 258 then decodes the symbols to recover the data and messages transmitted on the reverse link. The recovered voice/packet data is provided to a data sink 260, and the recovered messages may be provided to a controller 270. The processing by demodulator (DEMOD) 256 and RX data processor 258 are complementary to that performed at remote terminal 206. Demodulator (DEMOD) 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple remote terminals, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer (D) 252 and transmitted via antenna 250 to remote terminal 206.

At remote terminal 206, the forward link signal is received by antenna 220, routed through duplexer (D) 218, and provided to a receiver unit (RCVR) 222. Receiver unit (RCVR) 222 conditions (e.g., down converts, filters, amplifies, quadrature modulates, and digitizes) the received signal and provides samples. The samples are processed (e.g., despreaded, decovered, and pilot demodulated) by a demodulator (DEMOD) 224 to provide symbols, and the symbols are further processed (e.g., decoded and checked) by a receiving data processor 226 to recover the data and messages transmitted on the forward link. The recovered data is provided to a data sink 228, and the recovered messages may be provided to controller 230.

Figure 3:
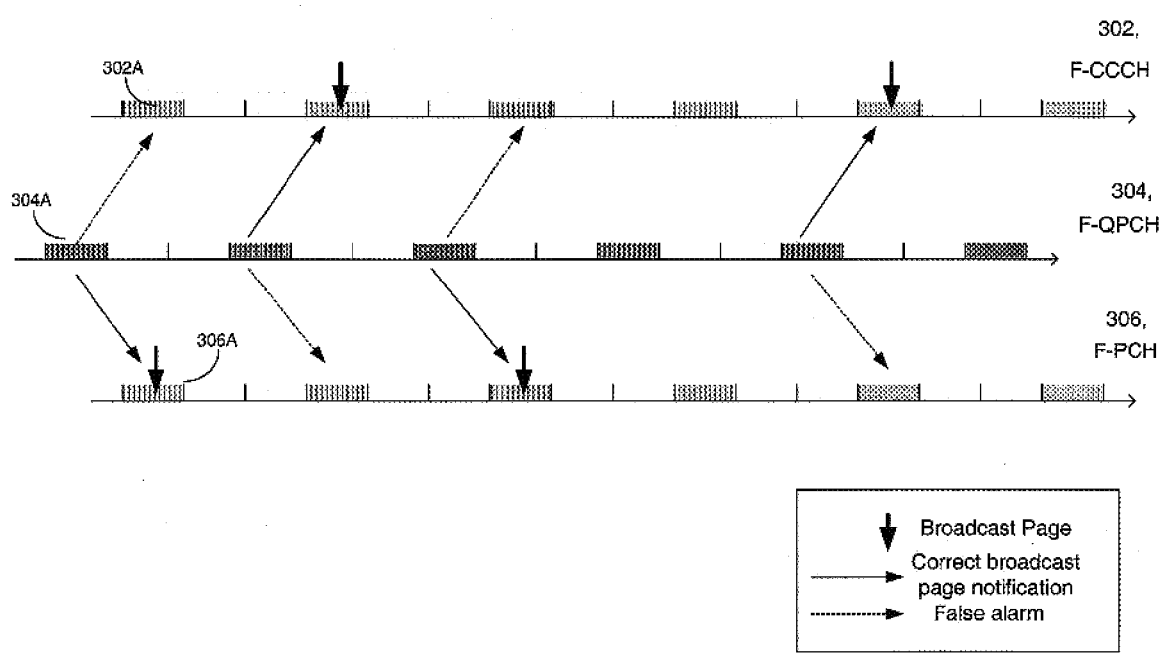
FIG. 3 is a representation of exemplary broadcast paging cycles for forward broadcast channels according to a first embodiment.

FIG. 3 shows a representation of an exemplary arrangement for the F-CCCH 302, F-QPCH 304, and F-PCH 306. In the arrangement shown in FIG. 3, the broadcast paging cycles on the F-CCCH and the broadcast paging cycles on the F-PCH have identical durations and start at identical slot numbers. Therefore, the respective broadcast page slots overlap. For example, the broadcast page slot 302A on the F-CCCH 302 overlaps with the broadcast page slot 306A on the F-PCH 306. Consequently, the BI bits on the F-QPCH slots point to the broadcast page slots on both the F-CCCH and the F-PCH. Specifically, if a BI bit on an F-QPCH slot were actually directed only to the F-PCH channel 306, the same BI bits would also erroneously point to the F-CCCH channel 302. This false signaling causes a mobile station designed to receive broadcast page on F-CCCH to unnecessarily wake up and monitor the F-CCCH. For example, the BI bits in the F-QPCH slot 304A that points to the broadcast page slot 306A on the F-PCH correctly wakes up a mobile designed to monitor F-PCH slot 306A, as shown by the solid-line arrow. However, because of the overlapping BPCs, the same BI bit also points to the broadcast page slot 302A on the F-CCCH 302, as shown by the broken-line arrow, which erroneously wakes up a mobile designed to monitor the F-CCCH.

Figure 4:
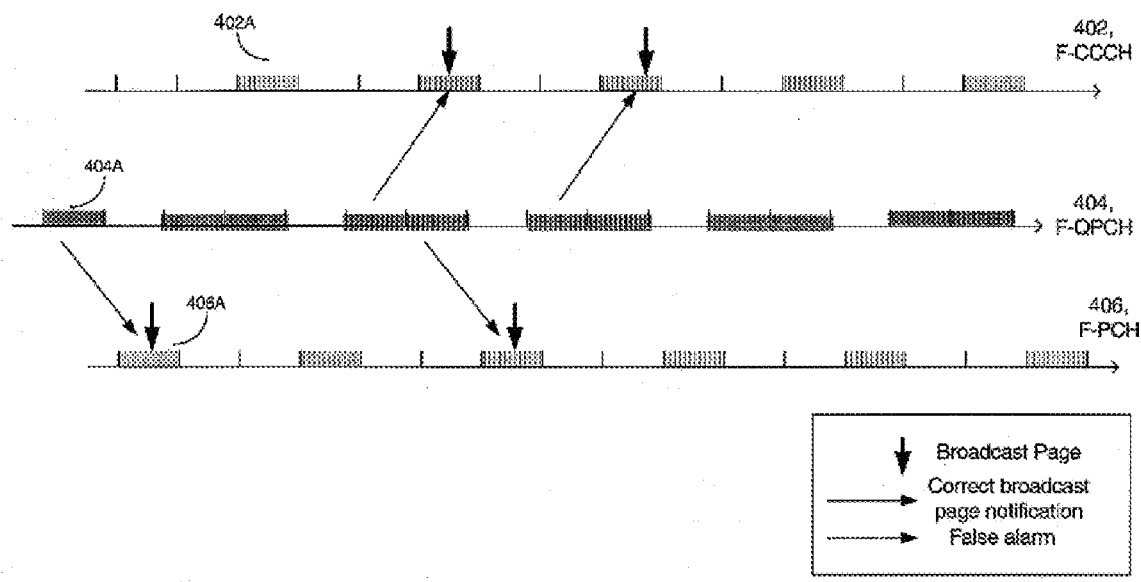
FIG. 4 is a representation of exemplary broadcast paging cycles for the forward broadcast channels according to a second embodiment.

According to one embodiment of the invention, the BPCs on the F-PCH and the F-CCCH may be shifted with respect to each other such that the broadcast slots on the F-CCCH and F-PCH do not overlap, as shown in FIG. 4. In FIG. 4, the broadcast page slots on the F-CCCH 402 do not overlap with the broadcast page slots on the F-PCH 406. Consequently, the BI bits on the quick paging channel slots on the F-QPCH channel do not point to both the F-CCCH slots and the F-PCH slots. Specifically, if a BI bit is directed to only one of the F-PCH or F-CCCH, the same BI bit does not point to the other of the F-PCH and the F-CCCH, which advantageously prevents a mobile station from unnecessarily waking up and monitoring the respective channel for broadcast messages. For example, the BI bit in the F-QPCH slot 404A that points to the broadcast page slot 406A on the F-PCH 406 correctly wakes up a mobile station designed to monitor the F-PCH, as shown by the solid-line arrow. Advantageously, the same BI bit does not point to the broadcast page slot 402A on the F-CCCH 402 because the F-QPCH slot 404A is positioned more than the allowed time interval, e.g., 100 ms, before the broadcast page slot 402A on the F-CCCH 402. Therefore, the two BPCs do not overlap, and only the intended target mobile stations wake up to monitor their respective broadcast page slots. This embodiment may have the following advantages: (1) the duration of one BPC need not be increased to avoid the overlap, which increases the average delay to deliver a broadcast message, and (2) the two BPCs may not overlap at any slot, thus eliminating false alarm due to broadcast paging and hence improving battery performance of the mobile station.

According to this embodiment, the base station may configure a predetermined shift into one of the equations that provide for the BPCs, such that the first slots of the BPCs are shifted by the predetermined shift. In one embodiment, the base station may introduce a shift of "N" slots in either the BPC on the F-CCCH or in the BPC on the F-PCH, as illustrated in the following equation:

$$(\lfloor t/4 \rfloor + N) \bmod (B+X) = 0$$

For example, when B+X=65, the base station may introduce a shift of two slots in the BPC on the F-CCCH compared to the BPC of the F-PCH. FIG. 4 shows the corresponding BPCs, and the first slots of the corresponding BPCs are shown in the following table:

|        | 1  | 2   | 3   | 4   | 5   | 6   | 7   | 8   | 9   | 10  | ... |
|--------|----|-----|-----|-----|-----|-----|-----|-----|-----|-----|-----|
| F-PCH  | 65 | 130 | 195 | 260 | 325 | 390 | 455 | 520 | 585 | 650 | ... |
| F-CCCH | 63 | 128 | 193 | 258 | 323 | 388 | 453 | 518 | 583 | 648 | ... |

Figure 5:
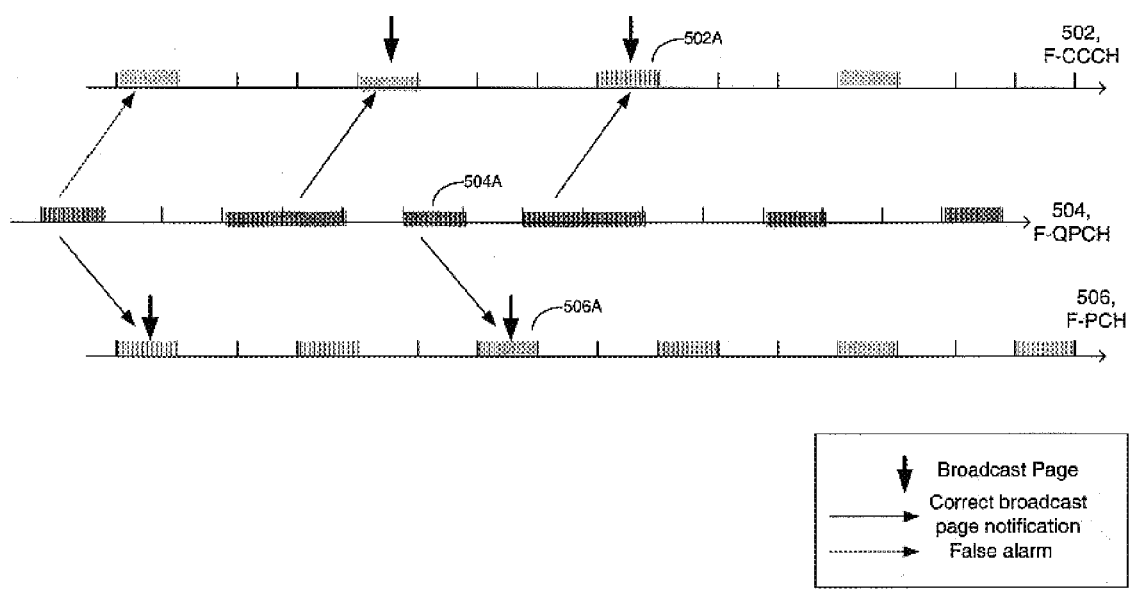
FIG. 5 is a representation of exemplary broadcast paging cycles for the forward broadcast channels according to a third embodiment.

According to another embodiment of the invention the base station may specify different values for $X_1$ and $X_2$ in the equations that provide for the BPCs of the F-PCH and F-CCCH, respectively, and thereby cause the BPCs of the F-PCH and the F-CCCH to have different periods. FIG. 5 shows an exemplary scenario where different values of $X_1$ and $X_2$ result in BPC=4 on the F-CCCH and BPC=3 on the F-PCH. Therefore, the broadcast page slots on the F-CCCH 502 do not overlap with the broadcast page slots on the F-PCH 506. Consequently, the same BI bit on the F-QPCH slots does not point to both the F-CCCH slots and the F-PCH slots. Specifically, if a BI bit were directed to only one of the F-PCH and F-CCCH channels, the same BI bit would not point to the other of the F-PCH and the F-CCCH, which advantageously prevents a mobile station's unnecessary wake up. For example, the BI bit in the F-QPCH slot 504A that points to the broadcast page slot 506A on the F-PCH 506 correctly wakes up a mobile designed to monitor the F-PCH. Advantageously, the same BI bit does not point to the broadcast page slot 502A on the F-CCCH 502 because the F-QPCH slot 504A is positioned more than the allowed time interval, e.g., 100 ms, before the broadcast paging slot 502A on the F-CCCH 502. For example, when B=64 and the base station sets $X_1=1$ on the F-PCH and $X_2=2$ on the F-CCCH, the following table shows the first slots of the resulting BPCs:

|        | 1  | 2   | 3   | 4   | 5   | 6   | 7   | 8   | 9   | 10  | ... |
|--------|----|-----|-----|-----|-----|-----|-----|-----|-----|-----|-----|
| F-PCH  | 65 | 130 | 195 | 260 | 325 | 390 | 455 | 520 | 585 | 650 | ... |
| F-CCCH | 66 | 132 | 198 | 264 | 330 | 396 | 462 | 528 | 594 | 660 | ... |

According to another embodiment of the invention, the base station may directly specify the values for BPCs of the F-PCH and the F-CCCH. The base station may specify different values for $B_1$ and $B_2$ in the equations that provide for the BPCs of the F-PCH and the F-CCCH, respectively, and thereby cause the BPCs of the F-PCH and F-CCCH to have different periods. The base station may specify the parameter "B" (rather than the BCAST_INDEX parameter) in the extended system parameters message for the F-PCH and in the system parameters message for the F-CCCH.

For example, the base station may set BPC=4 on the F-CCCH channel and BPC=3 on the F-PCH, as shown in FIG. 5. Therefore, the broadcast page slots on the F-CCCH 502 do not overlap with the broadcast page slots on the F-PCH 506, except possibly at the first slot at the first BPCs. Consequently, the same BI bit on the F-QPCH slots does not point to both the F-CCCH slots and the F-PCH slots. Specifically, if a BI bit were directed to only one of the F-PCH and the F-CCCH, the same BI bit would not point to the other of the F-PCH and the F-CCCH channel, which advantageously prevents a mobile station's unnecessary wake up. For example, the BI bit in the F-QPCH slot 504A that points to the broadcast page slot 506A on the F-PCH 506 correctly wakes up a mobile station designed to monitor the F-PCH. Advantageously, the same BI bit does not point to the broadcast page slot 502A on the F-CCCH 502 because the F-QPCH slot 504A is positioned more than the allowed time interval, e.g., 100 ms, before the broadcast paging slot 502A on the F-CCCH 502.

For example, for $B_1=60$ for the F-PCH and $B_2=62$ for the F-CCCH, the first slots of the corresponding BPCs are shown in the following table.

|        | 1   | 2   | 3   | 4   | 5   | 6   | 7   | 8   | 9   | 10  | .. |
|--------|-----|-----|-----|-----|-----|-----|-----|-----|-----|-----|----|
| F-PCH  | 60  | 120 | 180 | 240 | 300 | 360 | 420 | 480 | 540 | 600 | .. |
| F-CCCH | 62  | 124 | 186 | 248 | 310 | 372 | 434 | 496 | 558 | 620 | .. |

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method in a communication system, comprising:
   transmitting a plurality of first broadcast page time slots on a first paging channel and a plurality of second broadcast page time slots on a second paging channel; and
   shifting the plurality of first broadcast page time slots on the first paging channel with respect to the plurality of second broadcast page time slots on the second paging channel for the transmitting of the first broadcast page time slots and the second broadcast page time slots over non-overlapping time slots.

2. The method of claim 1, further comprising:
   transmitting a plurality of broadcast indicators on a third channel for indicating transmission of a broadcast page message on said first and second paging channels, thereby indicating transmission of the broadcast page message over only one of the first and second paging channels.

3. The method of claim 1, wherein said shifting further comprises:
   transmitting the plurality of first broadcast page time slots on the first paging channel and the plurality of second broadcast page time slots on the second paging channel at different broadcast page cycles.

4. An apparatus, comprising:
   means for transmitting a plurality of first broadcast page time slots on a first paging channel and a plurality of second broadcast page time slots on a second paging channel; and
   means for shifting the plurality of first broadcast page time slots on the first paging channel with respect to the plurality of second broadcast page time slots on the second paging channel for the transmitting of the first broadcast page time slots and the second broadcast page time slots over non-overlapping time slots.

5. The apparatus of claim 4, further comprising:
   means for transmitting a plurality of broadcast indicators on a third channel for indicating transmission of a broadcast page message on said first and second paging channels, thereby indicating transmission of the broadcast page message over only one of the first and second paging channels.

6. The apparatus of claim 4, wherein said means for shifting further comprises:
   means for transmitting the plurality of first broadcast page time slots on the first paging channel and the plurality of second broadcast page time slots on the second paging channel at different broadcast page cycles.

7. A wireless communication system, comprising:

a transmitter for transmitting a plurality of first broadcast page time slots on a first paging channel and a plurality of second broadcast page time slots on a second paging channel; and a controller for shifting the plurality of first broadcast page time slots on the first paging channel with respect to the plurality of second broadcast page time slots on the second paging channel for the transmitting of the first broadcast page time slots and the second broadcast page time slots over non-overlapping time slots.

8. The wireless communication system of claim 7, wherein said transmitter transmits a plurality of broadcast indicators on a third channel for indicating transmission of a broadcast page message on said first and second paging channels, thereby indicating transmission of the broadcast page message over only one of the first and second paging channels.

9. The wireless communication system of claim 7, wherein said controller shifts the plurality of first broadcast page time slots on the first paging channel and the plurality of second broadcast page time slots on the second paging channel by transmitting the first and second broadcast page time slots at different broadcast page cycles.

10. A base station in a wireless communication system, comprising:

a transmitter for transmitting a plurality of first broadcast page time slots on a first paging channel and a plurality of second broadcast page time slots on a second paging channel; and a controller for shifting the plurality of first broadcast page time slots on the first paging channel with respect to the plurality of second broadcast page time slots on the second paging channel for the transmitting of the first broadcast page time slots and the second broadcast page time slots over non-overlapping time slots.

11. The base station of claim 10, wherein said transmitter transmits a plurality of broadcast indicators on a third channel for indicating transmission of a broadcast page message on said first and second paging channels, thereby indicating transmission of the broadcast page message over only one of the first and second paging channels.

12. The base station of claim 10, wherein said controller shifts the plurality of first broadcast page time slots on the first paging channel relative to the plurality of second broadcast page time slots on the second paging channel by transmitting the first and second broadcast page time slots at different broadcast page cycles.

* * * * *